UNITED STATES PATENT OFFICE.

S. W. KIRK, OF COATESVILLE, PENNSYLVANIA, ASSIGNOR TO S. W. KIRK, OF SAME PLACE, AND C. E. STOTSENBURG, OF WILMINGTON, DELAWARE.

IMPROVED MODE OF PURIFYING CAST-IRON.

Specification forming part of Letters Patent No. 38,003, dated March 24, 1863; Reissue No. 3,594, dated August 10, 1869.

*To all whom it may concern:*

Be it known that I, S. W. KIRK, of Coatesville, in the county of Chester and State of Pennsylvania, have discovered a new and Improved Process of Purifying and Strengthening Cast-Iron; and I do hereby declare that the following description forms a full and exact specification of the same, wherein I have set forth the nature and principles of my said improvement, by which my discovery may be distinguished from others of a similar class, together with parts as I claim and desire to secure by Letters Patent.

My invention relates to the purification and strengthening of iron; and it consists in applying the binoxide and hyperoxide of manganese, or any oxides of the same which I prefer to use in lieu of the said binoxide, with or without the sesquioxide of iron or any other oxide of iron, alone or in combination, which I may prefer to use, to iron when the same has been rendered fluid by heat, for the purpose of washing out its impurities, as follows, to wit:

The black oxide of manganese is ground fine, mixed with a little water or a saturated solution of the carbonate of soda, and made into a paste of the consistency of dough, with which a ladle, basin, or other receptacle is lined on its bottom and sides. Into the said ladle or receptacle, lined as aforesaid, the iron in its fluid state is poured; or it may be used in any other way deemed most convenient and applicable to the mass of metal to be operated upon. The heat of the iron liberates the oxygen contained in the manganese, which unites with a portion of the carbon contained in the iron, and passes off as carbonic-acid gas. After the iron has been boiled with considerable energy for some time, caused by the escaping gas, the manganese will unite with the silica and other impurities that the iron contains, forming a slag, which rises to the top of the metal, leaving the iron comparatively pure and of great strength.

The amount of the material to be used cannot be stated in all cases, as that will depend entirely upon the quality of the iron to be operated upon. Therefore I do not wish to limit myself to any amount, but in most cases from two and a half to four per cent. will be found amply sufficient, and in cases where the sesquioxide of iron is used with manganese, three-fourths of one per cent. to one and half per cent. of each are used.

In the above description I have mentioned the sesquioxide of iron, because I believe it can be more advantageously used than any other oxide of that metal; but I do not wish to be understood as limiting myself to the use of the sesquioxide, as it is plain that the other oxides of iron or compounds of the same may be used in lieu thereof, without substantially changing the process.

I have also mentioned that oxide of manganese known as the "black oxide," not because it is the only oxide which may be used, but because I deem it the most available.

I wish it distinctly understood I do not claim the addition of manganese to iron as an alloy, as used by Mr. Morris Sterling, of England, and described in a work on metallurgy by Oberman, which is of doubtful utility; nor do I claim the presence of the carburet of manganese in iron or steel, as patented by a Mr. Heath, of England; nor do I claim its presence in the puddling-furnace, mixed with salt at the time iron is coming to nature, as it has been used before in this way; but

What I claim, and desire to secure by Letters Patent, is—

The use of the binoxide of manganese or any other oxide or oxides of the same which may be substituted in lieu thereof, with or without the sesquioxide of iron or any other oxide or oxides of the same which will effect substantially the same result, introduced to iron when the same is perfectly fluid, for the purpose of washing out the impurities of the said iron, substantially in the manner and for the purposes set forth.

S. W. KIRK.

Witnesses:
W. SCOTT CLARK,
G. G. HICKMAN.